United States Patent [19]

Frey et al.

[11] Patent Number: 5,444,762
[45] Date of Patent: Aug. 22, 1995

[54] METHOD AND APPARATUS FOR REDUCING INTERFERENCE AMONG CELLULAR TELEPHONE SIGNALS

[75] Inventors: Richard L. Frey, Duanesburg; Richard C. Gaus, Jr., Burnt Hills, both of N.Y.; Robert L. George, II, Plano, Tex.; Stephen M. Hladik, Albany, N.Y.; Howard L. Lester, Auplaus, N.Y.; Charles M. Puckette, Scotia, N.Y.; Jimmy C. Ray, Denison, Tex.

[73] Assignee: AirCell, Inc., Dallas, Tex.

[21] Appl. No.: 27,333

[22] Filed: Mar. 8, 1993

[51] Int. Cl.⁶ .................................. H04Q 7/20
[52] U.S. Cl. ........................... 379/58; 379/59; 455/25; 455/33.1; 455/33.3; 343/713; 343/742; 343/890
[58] Field of Search ............. 379/58, 59; 455/33.1, 455/33.3, 25, 32.1, 54.1, 56.1, 89, 98; 343/713, 741, 742, 756, 797, 876, 890, 891

[56] References Cited

U.S. PATENT DOCUMENTS

| | | | |
|---|---|---|---|
| 3,030,509 | 4/1962 | Katzin | 455/98 |
| 3,555,552 | 12/1969 | Alford | 343/890 |
| 4,249,181 | 2/1981 | Lee | 455/33.3 |
| 4,419,766 | 12/1983 | Goeken et al. | 455/56.1 |
| 4,509,053 | 4/1985 | Robin et al. | 343/708 |
| 4,595,928 | 6/1986 | Wingard | 343/742 |
| 4,747,160 | 5/1988 | Bossard | 455/33.3 |
| 4,868,577 | 9/1989 | Wingard | 343/713 |
| 4,979,170 | 12/1990 | Gilhousen et al. | 455/32.1 |
| 5,067,172 | 11/1991 | Schloemer | 455/54.1 |
| 5,121,128 | 6/1992 | van Lidth de Jeude et al. | 343/741 |
| 5,123,112 | 6/1992 | Choate | 455/56.1 |
| 5,212,804 | 5/1993 | Choate | 455/33.1 |

OTHER PUBLICATIONS

Mobile Satellite Reports article, "Skycell Service Asks Spectrum, Claims Better Air-To-Ground Service", V. 4, No. 1, Warren Publishing, Inc. Apr. 20, 1990.

*Primary Examiner*—Curtis Kuntz
*Assistant Examiner*—Dwayne D. Bost
*Attorney, Agent, or Firm*—Jerry C. Ray

[57] ABSTRACT

Directional antennae on aircraft and on cellular telephone base stations, having a polarity opposite that of potentially interfering ground system signals, minimize signal strength of air cellular signals received by ground cellular stations. Aircraft directional antennae comprise patch antennae or vertical arrays of loop elements or vertical arrays of virtual loop elements. Additionally, air cellular signals are switched to channels not currently in use by ground cellular systems.

2 Claims, 5 Drawing Sheets

5 db/division

-90 DEG.
10 db/division

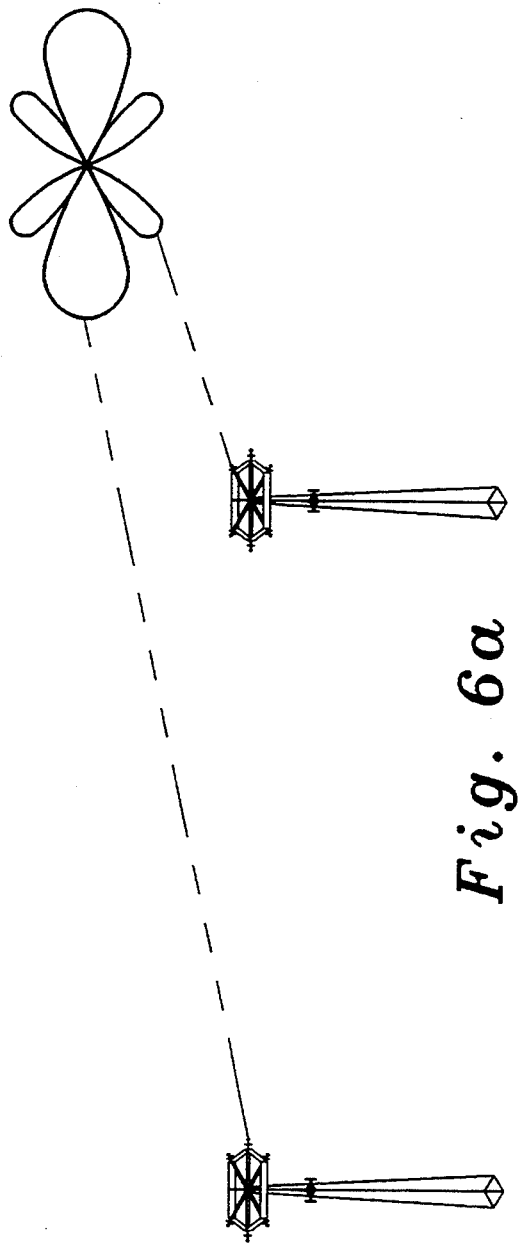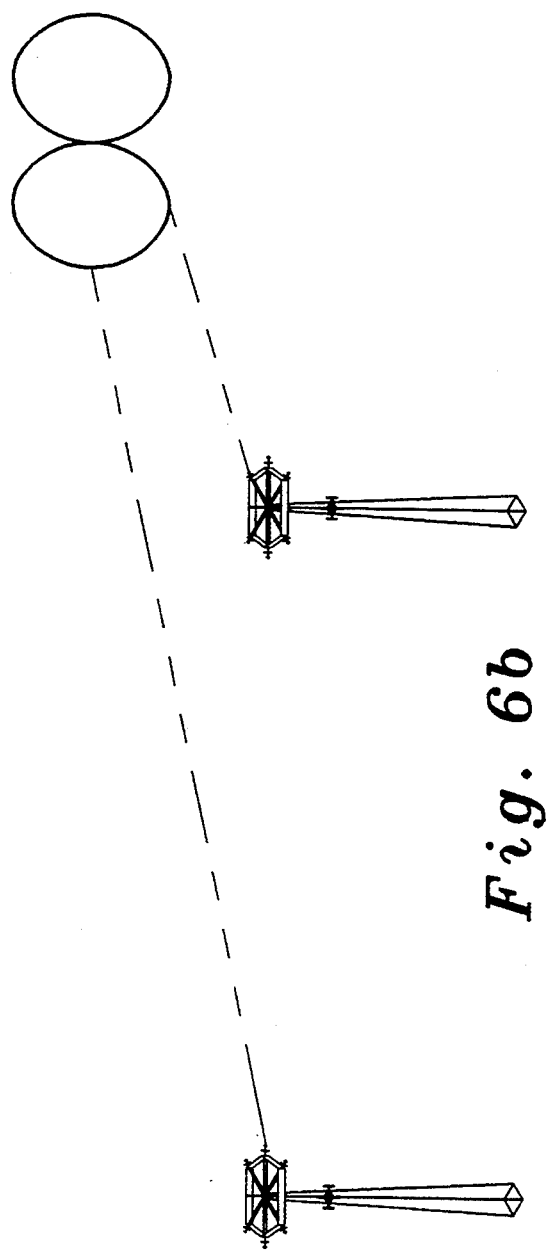
Fig. 6a
Fig. 6b

METHOD AND APPARATUS FOR REDUCING INTERFERENCE AMONG CELLULAR TELEPHONE SIGNALS

CROSS REFERENCE TO RELATED APPLICATION(S)

This application is related to copending application Ser. No. 07/847,920 filed Mar. 6, 1992, commonly assigned with the present invention.

BACKGROUND OF THE INVENTION

(1) Field of the Invention

This invention relates generally to methods of reducing interference among cellular telephone signals, and among aircraft cellular telephone signals and ground cellular telephone signals. The apparatus disclosed includes, for aircraft, horizontally-polarized directional radio-frequency antennae comprising patch antennae or an array of virtual loop antenna elements.

(2) Description of the Related Art

Existing cellular telephone systems use both directional and non-directional antennae. Directional radio-frequency antennae are well known because most types of antennae exhibit some directional characteristics. Directional antennae are used in radar, direction finding, microwave transmissions, short-wave broadcasts, and in other applications, while in commercial radio broadcasting the signal is generally broadcast in all directions.

Cellular telephone systems for ground stations comprise numerous mobile cellular telephone stations which transmit and receive ultrahigh-frequency signals to and from a network of cellular telephone base stations, herein referred to as ground cellular base stations or as ground base stations. The ground base stations are connected to the switched telephone network. Timing and control of cellular calls is performed by a mobile telephone controller.

Ground base stations include antennae mounted on towers, buildings, or other elevated locations. The areas covered by the various base stations necessarily overlap somewhat in order to produce full coverage of a service area. Determination of which base station will control a call to or from a particular mobile station is on the basis of signal strength; the base station at which the signal received from the mobile station is strongest will be assigned to control the call.

The cellular system in North America uses a two-frequency cellular telephone channel for each call, one frequency for transmitting and one for receiving. A total of 832 such channels are available for cellular telephone use, between the frequencies of 824 MHz to 849 MHz, and 869 MHz to 893 MHz.

Antennae on ground mobile cellular stations such as automobiles, trucks, and boats are vertically polarized, and antennae on base stations are likewise vertically polarized to provide more efficient coupling between the antennae. As will be seen below, a different polarization between base and mobile stations has a marked effect on the effectiveness of transmissions between the two stations.

A particular problem is encountered when attempting to use a cellular telephone from an aircraft. Because of the elevated position of a mobile cellular telephone station aboard an aircraft, its signal is broadcast over a wide area of the earth's surface, where it is received by several ground cellular base stations. A high-flying aircraft is at a substantially equal distance from several ground cellular base stations, and a signal transmitted from the aircraft is received at approximately the same strength by these base stations. The similarity in the received signal strength causes difficulty for the ground system in determining which ground base station should control the call. This problem, along with the resulting interference, has led to the current prohibition of the use of airborne mobile cellular telephone stations.

With regard to aircraft antennae and directional antennae, applicant is aware of the following patents which are disclosed because they may be considered material by the examiner:

| U.S. Pat. No. | Issue Date | Applicant |
| --- | --- | --- |
| 5,121,128 | June 9, 1992 | van Lith de Jude, et al. |
| 4,595,928 | June 17, 1986 | Wingard |
| 4,352,200 | Sep. 28, 1982 | Oxman |
| 4,325,121 | Apr. 13, 1982 | Ghose |
| 4,117,491 | Sep. 26, 1978 | Hanna et al. |
| 3,641,580 | Feb. 8, 1972 | Monser |

SUMMARY OF THE INVENTION

(1) Progressive Contribution to the Art

A means of overcoming the problem of making cellular telephone service available to aircraft is to provide a separate system of antennae on base stations and on aircraft for cellular telephone communications. Base stations so equipped are herein referred to as air cellular telephone base stations. The separate antenna system for airborne cellular telephone stations uses the same frequencies allocated for use by ground cellular equipment, and may be visualized as an auxiliary cellular telephone system for aircraft, interconnected with the existing ground cellular network. Cellular telephone signals directed to and from aircraft are herein referred to as air cellular signals, and those directed to and from ground vehicles are referred to as ground cellular signals. It is understood, however, that an air cellular telephone system is not limited to use of frequencies allocated to ground cellular telephone systems. Any suitable frequency may be used for air cellular communications, provided of course that the Federal Communications Commission approves such use.

The problem now becomes one of achieving separation of received power levels between the cellular telephone system for aircraft, referred to herein as the air cellular system, and the ground cellular system so that any interference between the two systems does not cause disruption of either voice or control communications.

Any communications system depending on electronic transmissions must achieve a certain minimum signal-to-noise ratio for the signal to be of acceptable quality. A separation between a signal power level and a background or "noise" power level of at least 6 deciBel (dB) is required for interference-free cellular telephone communication, and a separation of 18 dB or more is desirable. A decibel is a unit of power equal to 10 times the common logarithm of a ratio of two power levels, so a difference of 18 dB approximates a 64-to-1 power ratio.

Separating the power levels of the air cellular signals and the ground cellular signals includes the use of horizontally polarized aircraft directional antennae and horizontally polarized base station antennae. Horizontally polarized air cellular telephone signals are transmitted and received between the two sets of antennae. Because antennae on ground mobile stations and on ground cellular base stations are vertically polarized, such horizontal polarization provides considerable separation between the two sets of signals. Flight tests measuring received power levels of vertically and horizontally polarized signal have been conducted. Where the transmitted signal polarization is opposite that of the receiving antenna, the signal power level is 16 dB to 24 dB weaker than with an antenna of the same polarization. Flight test results varied depending on the distance between the airborne station and the ground station, and on the transmitted power level.

It is understood that where a potentially interfering ground communication system uses horizontally polarized antennae, antennae on the aircraft would be vertically polarized to achieve separation of signal power levels between the two systems. Polarization of the air cellular signals is established as required to be substantially opposite that of interfering ground system signals.

Another part of the method to increase signal separation, especially when used in conjunction with horizontal polarization of antennae as described above, is the use of directional antennae on the air cellular base stations and on aircraft. Directional antennae, as used herein, are defined broadly as antennae having a non-isotropic radiation pattern; i.e., directional does not imply that the signal is transmitted or received from a particular direction. For example, an antenna having a substantially toroidal radiation pattern as described below is considered to have directional characteristics.

An air cellular telephone base station is defined as a set of antennae for receiving and transmitting cellular telephone transmissions to and from aircraft, interconnected to a switched telephone network as are the antennae for ground cellular base stations. Cellular telephone base station directional antennae have a radiation pattern directed above a horizontal plane encompassing said antenna. The air cellular base stations have much of their radiated power directed to angles greater than 2 or 3 degrees above the horizon, thus avoiding interference with ground cellular mobile stations and ground base stations. In one embodiment, aircraft directional antennae have a substantially toroidal radiation pattern; the zone of greatest power density has a shape similar to that of a FIG. 8 lying on its side. Thus the radiation pattern from the aircraft directional antenna delimits a substantially conical null signal zone, with an axis of the conical zone parallel to an axis of the toroid. Aircraft directional antennae are mounted on the aircraft so that the null signal zone extends generally downwards from the aircraft. When the aircraft is overflying a particular area, the null signal zone precludes air cellular telephone signals from the aircraft from interfering with ground cellular telephone signals in the area beneath the aircraft. Similarly, ground cellular signals from mobile and base stations in that area will be received by the aircraft antenna at very low signal power levels, or not received at all.

Signals from aircraft are transmitted at a low power level so that where an air cellular signal is received by a ground cellular base station, the signal strength of the air cellular signal will be too low to interfere with the ground cellular station.

Because the directional characteristics of an antenna affect its reception as well as its transmissions, a cellular station in an aircraft equipped with antennae as described above would have limited capability to communicate with a base station directly below the aircraft. Several techniques are possible for communicating with a base station in the null area should that be desirable or necessary, including:

(1) electronically disabling all array elements except one when the aircraft is near an air cellular base station, so the aircraft antenna vertical gain pattern resumes that of a one-element loop antenna;
(2) adding a stub antenna having a broad pattern of radiation to the underside of the aircraft to be used in the vicinity of an air cellular base station;
(3) electronically steering the array's main beam to produce a downward tilt in the array's vertical gain pattern;
(4) locating air cellular base stations away from established air corridors to avoid having the aircraft in their immediate vicinity.

Even using the above-described techniques, it is possible for limited interference between the ground system and the air system to occur. Such occasional interference can be overcome by shifting the cellular channels used by aircraft to channels not being used by the ground system. By virtue of their altitude, aircraft are in a position to monitor cellular telephone channels in the vicinity of the aircraft. Also, cellular equipment aboard the aircraft can receive information from the ground system regarding unused frequencies. Monitoring equipment aboard the aircraft includes a scanner to continuously poll the spectrum of cellular telephone frequencies. Those channels not currently in use are determined, and also those channels having a weak signal reaching the aircraft. When determined by equipment aboard the aircraft, information on unused or weak-signal channels is sent as part of the control protocol to the ground cellular system so the ground system will know which channels are available for use by the aircraft. On command from the control center, the base station and the airborne station switch air cellular signals to and from the aircraft to a channel not currently in use by the ground cellular system. Channels are switched quickly and simultaneously, so that callers notice no interruption or a very minimal interruption in their conversation. The channel-switching process may be performed several times during the course of a call.

The above-described frequency shifting is made possible by the inclusion of data for the control of air cellular communications in the protocol used by the ground cellular system. The current standards leave unused digital bits within the protocol used by the ground system. The extended protocol allows the ground system to control calls to and from aircraft in the same way that calls to and from ground mobile stations are presently controlled.

(2) Objects of this Invention

An object of this invention is to provide for cellular telephone communications with aircraft.

Another object of this invention is to reduce the degree of interference between an existing ground cellular telephone system and an air cellular telephone system using the same frequency allocations as the ground system.

Another object of this invention is to provide an antenna system for aircraft suitable for cellular telephone communications with base stations.

Another object of this invention is to provide an antenna for cellular telephone communications with aircraft which is of a size and configuration that can be readily mounted on aircraft without excessively disturbing the aerodynamic characteristics of the aircraft.

Further objects are to achieve the above with devices that are sturdy, compact, durable, lightweight, simple, safe, efficient, versatile, ecologically compatible, energy conserving, and reliable, yet inexpensive and simple to manufacture, install, and operate.

Other objects are to achieve the above with a method that is rapid, versatile, ecologically compatible, energy conserving, and inexpensive, and that does not require highly skilled people to install, operate, and maintain.

The specific nature of the invention, as well as other objects, uses, and advantages thereof, will clearly appear from the following description and from the accompanying drawings, the different views of which are not necessarily scale drawings—in some cases the size of components of the invention have been changed for clarity.

BRIEF DESCRIPTION OF THE DRAWINGS

FIG. 6A is a representation of an array antenna interacting with near and distant base stations.

FIG. 6B is a representation of a loop antenna interacting with near and distant base stations.

DESCRIPTION OF THE PREFERRED EMBODIMENT

Figure 1:
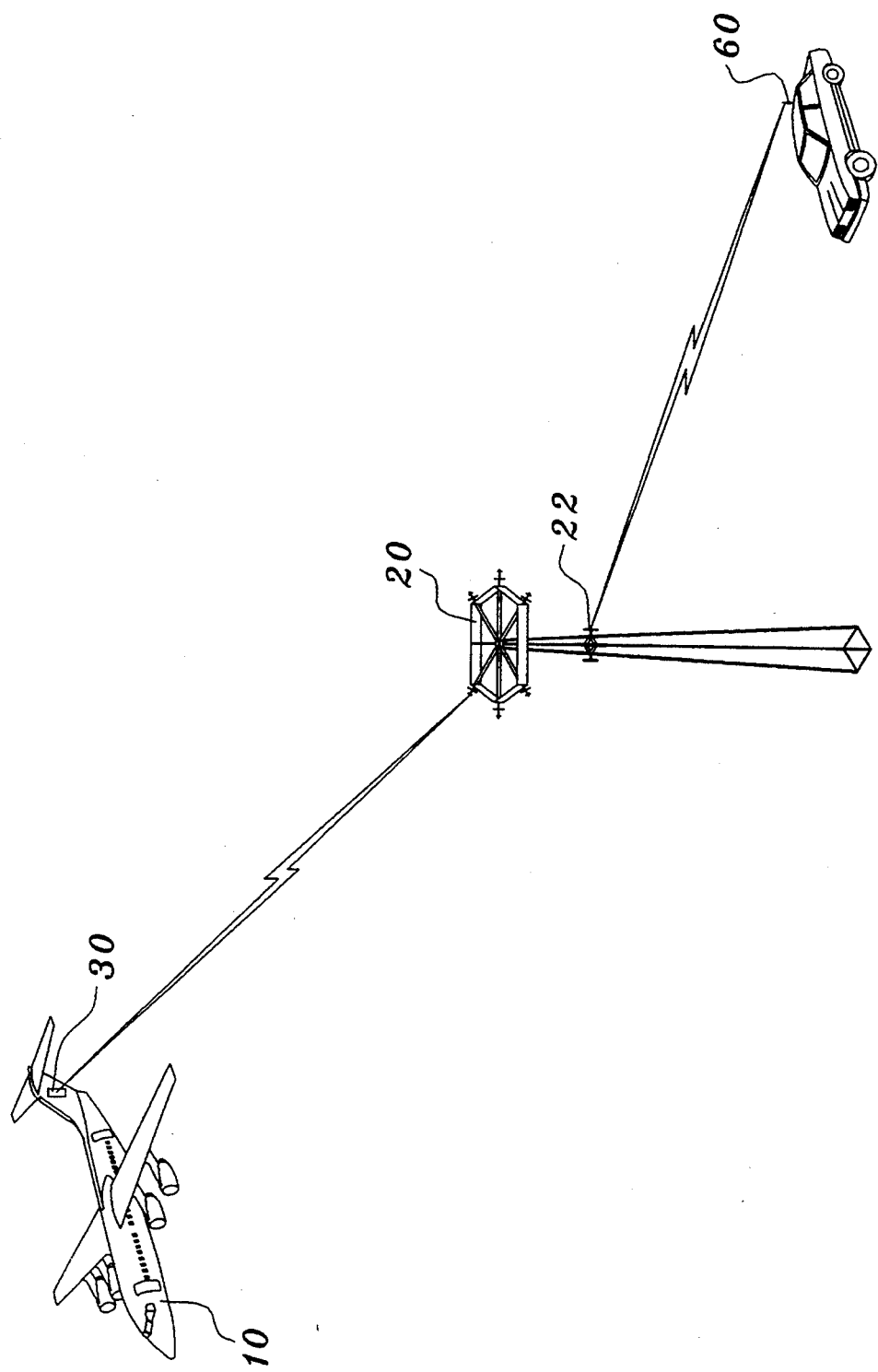
FIG. 1 is a schematic or pictorial representation of a base station tower having one set of antennae for communicating with ground mobile units and another set of antennae for communicating with air mobile units.

Referring to the drawings, FIG. 1 shows a mobile cellular telephone station aboard an aircraft 10 connected to an aircraft directional antenna 30, transmitting and receiving signals to and from an air cellular telephone base station 20. A ground mobile cellular station 60 communicates with a ground cellular base station 22. The air cellular base stations 20, like ground cellular base stations 22, are connected to the switched telephone network. It is understood that an aircraft communication system may be a system other than a cellular telephone system, and the ground communication system similarly may be other than a cellular telephone system.

Figure 2:
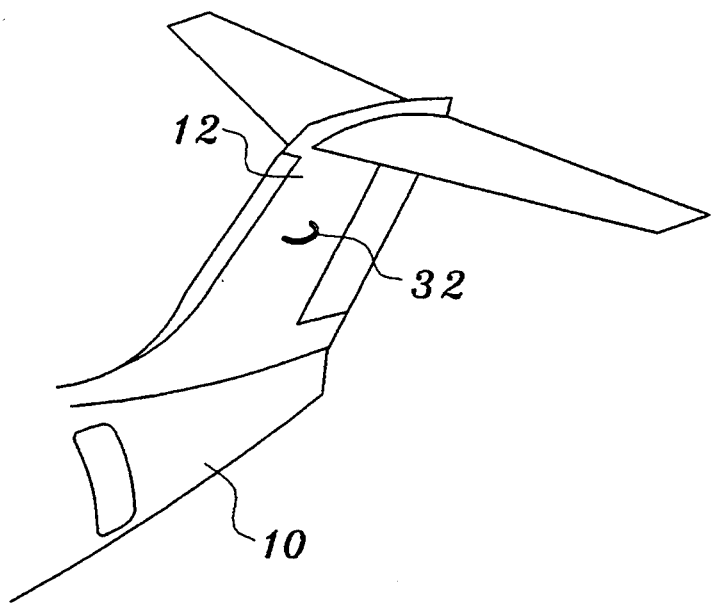
FIG. 2 is a representation of one side of an antenna comprising two virtual loop elements mounted on an aircraft.
Figure 3:
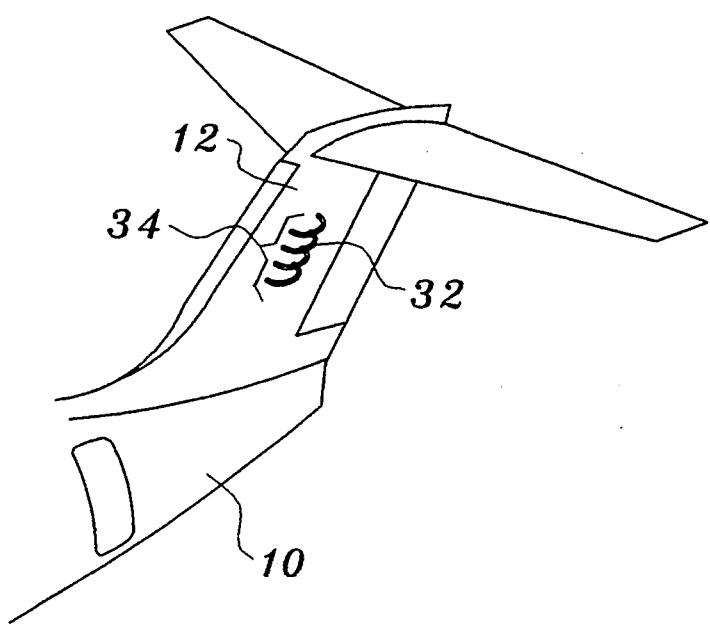
FIG. 3 is a representation of one side of an array of virtual loop antenna elements mounted on an aircraft.
Figure 4:
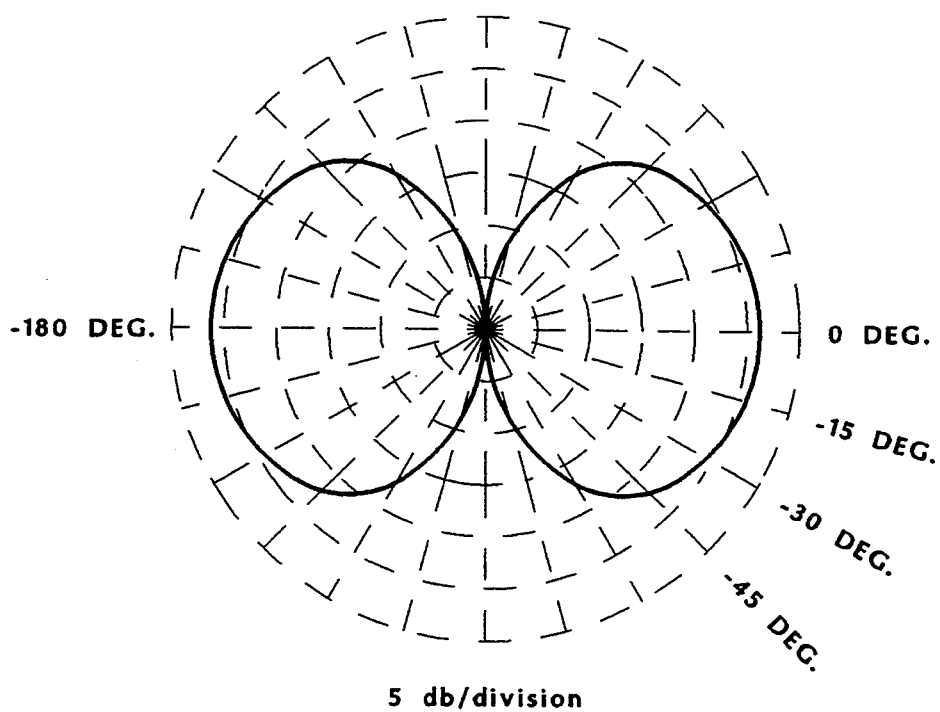
FIG. 4 is a representation of a radiated power pattern from a simple loop antenna.

FIG. 2 shows an aircraft antenna comprising two half-loop elements 32 forming a single virtual loop. The radiation pattern from a single-loop antenna, shown in FIG. 4, is a substantially toroidal radiation pattern which delimits a substantially conical null signal zone above and below the toroid. FIG. 3 shows an aircraft directional antenna mounted on the aircraft 10 which is an array 34 of loop antenna elements 32. An array, as used herein, means an antenna having more than one element. In this embodiment the loop antenna elements 32 are spaced apart along a common axis and oriented so that a diameter of the loop antenna elements is normal to the common axis. The loop antenna elements have a circumference approximately equal to one wavelength of the carrier frequency used by the cellular telephone equipment. Spacing is approximately one-half wavelength between each element. The array is electronically horizontally polarized where the potentially interfering ground system signals are vertically polarized, and vertically polarized where the potentially interfering ground signals are horizontally polarized. Thus the aircraft directional antennae and the ground directional antennae have a signal polarization substantially opposite that of a potentially interfering ground communication system.

Figure 5:
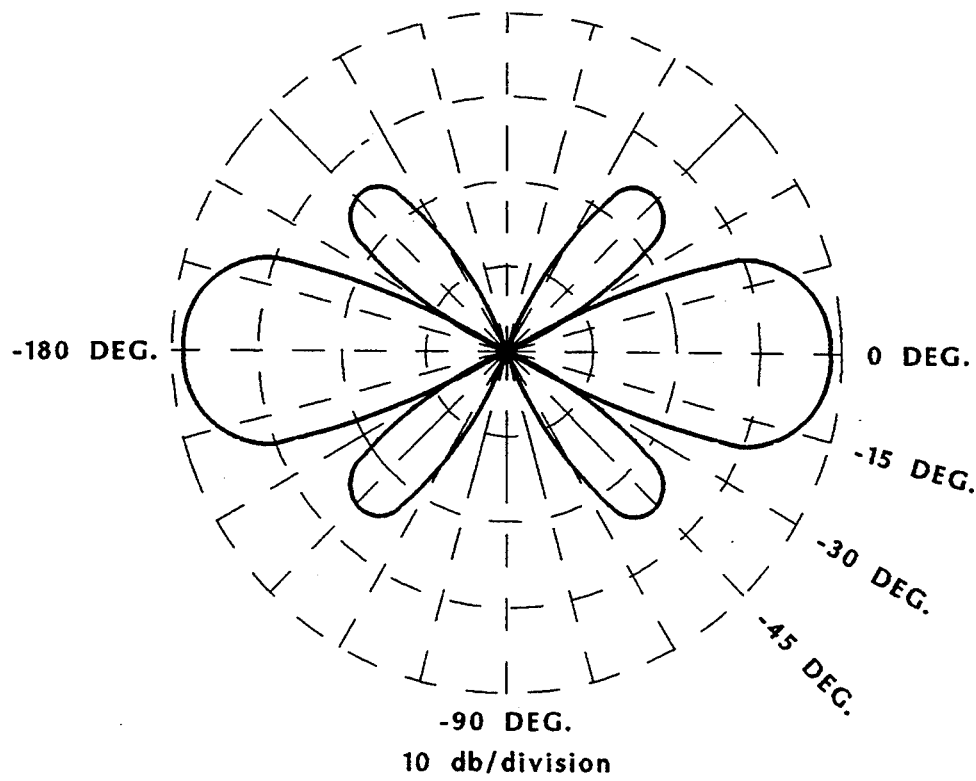
FIG. 5 is a representation of a radiated power pattern from an array of virtual loop antenna elements.

FIG. 5 shows a radiation pattern from a four-element loop array. FIG. 6A shows, interaction between a radiation pattern from an array with near and distant base stations; FIG. 6B shows interaction between a radiation pattern from a single loop antenna with near and distant base stations. FIGS. 6A and 6B illustrate the stronger interaction between the single loop antenna with a ground base station near the aircraft, compared to the weaker interaction of the array with a base station near the aircraft. The weaker side lobes of the radiation pattern from the array result in a weaker signal being transmitted to and received from a base station near the aircraft. In both the single loop antenna and the array, a substantially conical null signal zone exists below the aircraft, so that a base station in this area will receive a very weak signal or no signal from the aircraft antenna.

For some installations, especially for nonconventional aircraft such as helicopters or lighter-than-air craft, the array may be mounted as a separate unit attached to the aircraft. In this embodiment, the array comprises loop elements and not virtual loop elements. Such a mounting would preferably be to the underside of an aircraft so the metallic body of the aircraft would not interfere with antenna performance.

Mounting the array as a unit as described above allows mechanical steering of the array, that is, physically tilting the array by servo motors or by other means. When the array is mechanically steered, the radiation pattern is tilted in the same direction. Thus the signal strength can be increased or decreased in a particular direction, e.g., toward a particular air cellular base station.

Where it is impractical to mount an complete array as a unit on an aircraft, other configurations are used. For conventional aircraft the preferred placement of the antenna is on the vertical stabilizer 12 of the aircraft 10, as shown in FIG. 3. Because the vertical stabilizer physically and electronically interferes with the installation of loop antenna elements, the loop elements are divided into segments or half-loop elements 32. The half-loop elements are mounted on either side of the surface of the vertical stabilizer 12. FIG. 3 shows one side only of a vertical stabilizer 12 having an array 34 of virtual loop antenna elements 32 mounted on the stabilizer. Where the antenna is a four-element array, four half-loop elements are mounted on each side of the vertical stabilizer. The half-loop elements 32 are electrically isolated from the vertical stabilizer and electronically connected in pairs by being fed a signal in the proper phase so that each pair of half-loop elements forms a virtual loop element. A virtual loop element, as used herein, is defined as two or more loop segments electronically connected so the effect is that of a single loop dement. An array of virtual loop elements approximates the same electronic dimensions as described above for the array of loop elements.

A signal is fed to the virtual loop elements 32 through a coaxial cable (not shown) which is routed through the interior of the vertical stabilizer and through the fuselage of the aircraft to the cellular telephone equipment.

Tapered illumination of the antenna elements is used to determine the radiation pattern of the array. Tapered illumination is defined as supplying different levels of power to the virtual loop elements comprising the array, and more particularly as supplying lesser amounts of power to the outer elements of the array than to the inner elements. Use of tapered illumination increases the size of the primary lobe of radiation and reduces the size of side lobes. Tapered illumination of the elements, and corresponding changes in the radiation pattern, is utilized to overcome signal strength deficiencies caused by the aircraft's altitude, or its position relative to the nearest air cellular base station.

Also, the array may be electronically steered. As used herein, electronic steering is defined as adjusting the phase and in some cases the magnitude of the signal fed to the various elements of an array. A non-steered array has a signal fed in the same phase to all elements of the array. In a steered array, the phase of the signal fed to an element of the array is varied as a function of the element's distance from the end of the array. As an example, a 4-element array using a uniform phase taper might have the first element being fed a signal with no phase shift, the next element receiving a signal having a 5° phase delay, the third element receiving a signal having a 10° phase delay, and the fourth element receiving a signal having a 15° phase delay. It is understood that the amount of phase shift can vary from the example given, and that the phase shift might be non-uniform. The radiation pattern from a vertical array can be steered upwards or downwards.

In one embodiment, the virtual loop elements are enclosed in or housed in a layer of plastic or other material to form a radome which shields the antenna elements from the weather.

Figure 7:
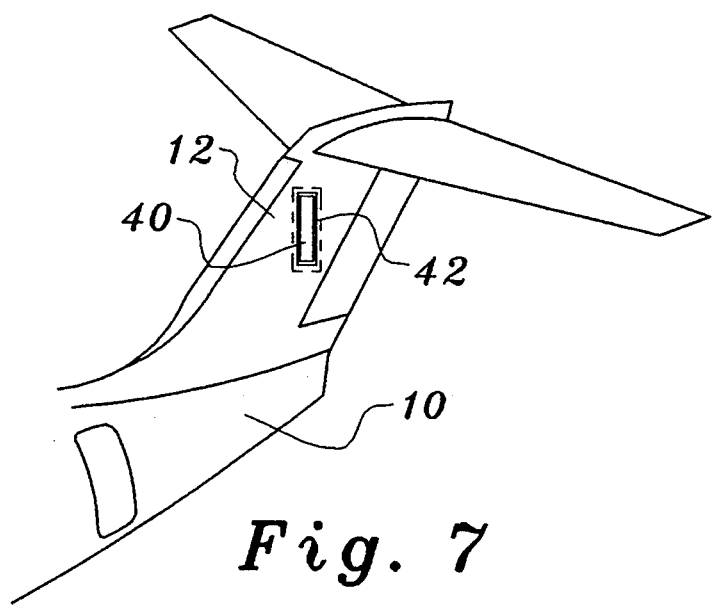
FIG. 7 portrays one patch antenna mounted on the vertical stabilizer of an aircraft.

In another embodiment, the aircraft antenna is one or more patch antennae 40, shown in FIG. 7, having a radiation pattern equivalent to that of the array described above. A patch antennae comprises a metallic radiating element usually mounted above a ground plane and separated from the ground plane by a dielectric material. The metallic element is a strip of metal, spaced less than a wavelength apart from ground plane. Radiation from the metallic element is primarily from its edges. Power may be fed to the patch at various points on its surface or along its edges. The radiation pattern of a patch antenna is determined in part by the location at which it is fed.

Figure 8:
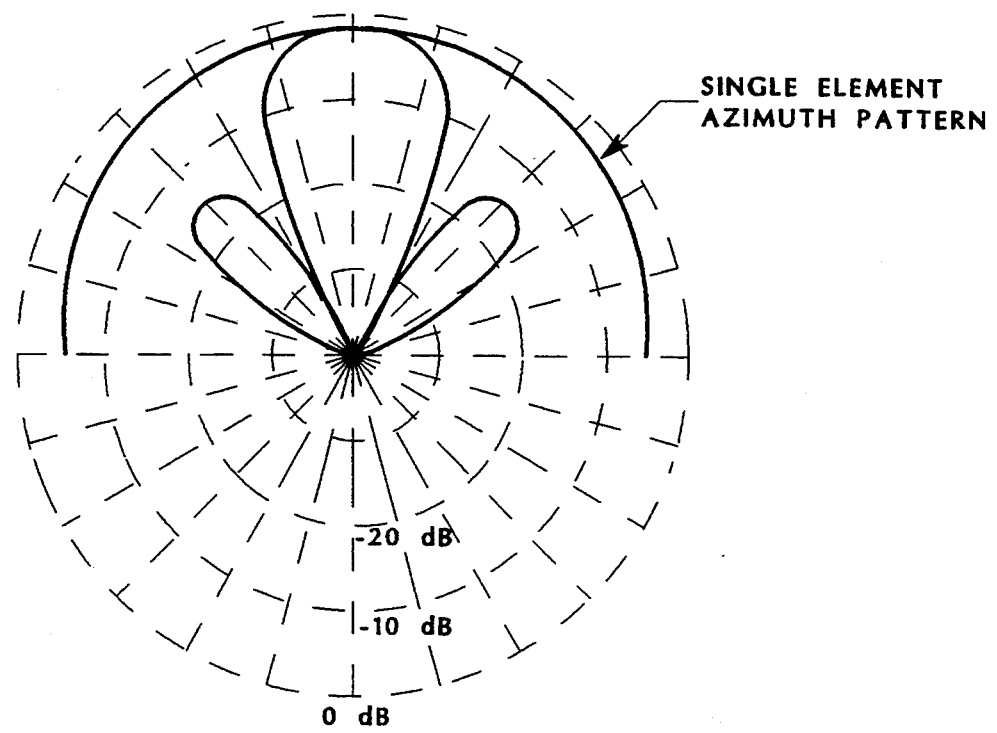
FIG. 8 is a representation of a radiated power pattern from a single patch antenna.

To form the desired complete radiation pattern, a patch antenna 40 is placed on each side of the vertical stabilizer 12, and the two are electronically connected. FIG. 8 shows one radiation pattern from a single patch antenna; two patch antennae on either side of the vertical stabilizer produce a radiation pattern equivalent to that of a four-element array as shown in FIG. 5.

The patch antennae may be mounted within a recess in the surface on either side of the vertical stabilizer. Patch antennae are thin relative to width and height: one embodiment utilizes a pair of patch antennae each of which measures about $\frac{3}{8}$ inch thick, 5 inches wide, and 24 inches high. Where the antennae are protected by radomes, the radomes need not extend more than one inch from the surface of the vertical stabilizer. Thus the structure remains wholly or partially within the boundary layer of the airflow around the vertical stabilizer, causing minimal aerodynamic drag.

We claim:

1. A method of reducing interference among aircraft communication system signals and ground communication system signals, comprising the following steps:
   (a) connecting at least one aircraft communication station to at least one aircraft directional antenna, said aircraft directional antenna having a horizontally polarized signal to provide signal separation from ground cellular telephone systems,
   (b) connecting at least one ground communication station to at least one ground directional antenna, said ground directional antenna having a horizontally polarized signal, and having a radiation pattern directed above a horizontal plane encompassing said antenna,
   (c) combining a directionality of said aircraft antennae and said ground antennae with a horizontally polarized signal, said horizontal polarization being oppositely polarized respective to ground cellular telephone systems, and
   (d) transmitting and receiving signals between said aircraft directional antennae and said ground antennae;
   (e) connecting at least one mobile cellular telephone station to at least one aircraft directional antenna, said aircraft directional antenna having a toroidal radiation pattern and at least one conical null signal zone, so that said conical null signal zone reduces a signal level of a signal transmitted from said aircraft directional antenna in an area directly below an aircraft,
   (f) connecting at least one cellular telephone base station directional antennae to a switched telephone network, said base station directional antennae having a radiation pattern directed above a horizontal plane encompassing said antenna.
   (g) transmitting and receiving cellular telephone signals between said aircraft directional antennae and said cellular telephone base station directional antennae.

2. The invention as described in claim 1, wherein the step of transmitting and receiving cellular telephone signals further comprises:
   (h) transmitting from said aircraft directional antenna a signal strength less than a predetermined level, said predetermined level being a level which would interfere with ground-based cellular telephone systems.

* * * * *